April 1, 1930. W. RIEHM 1,753,021
PROCESS AND APPARATUS FOR STARTING INTERNAL COMBUSTION ENGINES
Filed April 11, 1925
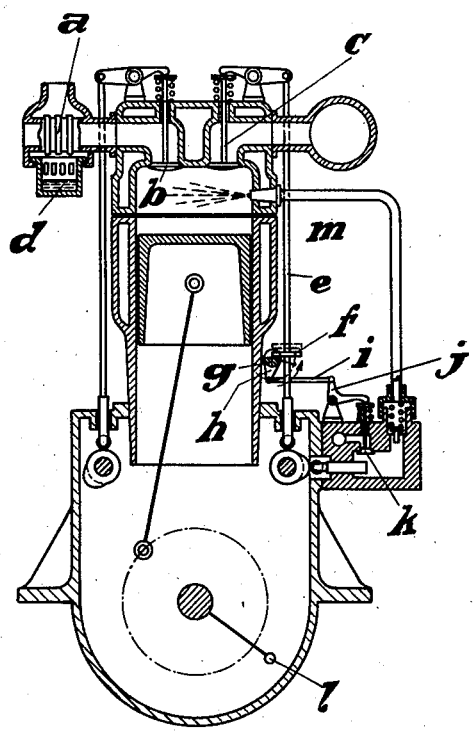
Inventor
Wilhelm Riehm
by Marechal and Noe
attorneys.

Patented Apr. 1, 1930

1,753,021

UNITED STATES PATENT OFFICE

WILHELM RIEHM, OF AUGSBURG, GERMANY, ASSIGNOR TO THE FIRM: MASCHINEN-FABRIK AUGSBURG-NUERNBERG, AKTIENGESELLSCHAFT, OF AUGSBURG, GERMANY, A CORPORATION OF GERMANY

PROCESS AND APPARATUS FOR STARTING INTERNAL-COMBUSTION ENGINES

Application filed April 11, 1925, Serial No. 22,327, and in Germany April 15, 1924.

The starting of high pressure engines working on heavy fuel oils, with self ignition as Diesel-engines is generally effected by compressed air. This process, however, cannot be employed for smaller engines, for instance engines used to propel vehicles, as these engines generally work without compressed air injection, therefore are not provided with an air-pump and would soon use up the starting air supply carried with them, which would cause disagreeable troubles during the course of their work. On the other hand, with vehicle-engines the limited space will often make it difficult to carry special starting air receivers, apart from the fact that this would considerably increase the cost of the whole engine installation. Therefore it is more suitable to have these small engines either started by hand or by means of a small starting engine. The difficulty of this, however, contrary to the low pressure engines, lies in the fact that even at comparatively small cylinder diameters, the high compressions used for these engines will make it nearly impossible to crank the engine. It is known from the low pressure-engines this difficulty is avoided by partially or wholly eliminating the compression and to switch the usual compression on as soon as the fly wheel attains a certain speed. But this procedure is not sufficient to guarantee a safe starting of the engines working with high pressures on heavy oil with self ignition. When starting, the ignition requires a sufficiently high pressure-air temperature in the combustion chamber. This temperature cannot be attained by the aforementioned process alone, all the more so in the cold season, because, when starting, the piston speed is always low, so that the final temperature of the compression, taking the loss of heat into consideration caused by the cylinder walls, remains lower than the ignition temperature.

It is also known to us, that the sucked in ignition air for these low-compression engines is pre-heated to facilitate the starting, and this of course results in a higher final temperature at the end of the compression in the cylinder.

The present invention consists in the application and unification of these known measures to the high-compression engine art. The engine is consequently started with relieved compression, turned on to normal compression, at the same time heating the sucked in air through an outer source of heat to a high degree. The complete elimination of the compression makes it possible to start high-pressure-engines to a certain capacity by hand, and the heating of the ignition air raises the compression temperature in the combustion chamber to such an extent, when the normal compression is turned on, that this temperature lies still higher than the ignition temperature of the fuel, even taking the losses of heat into consideration which are due to the conduction through the cylinder walls. Through combining these two known processes it is possible to start high-pressure-combustion-engines (Diesel engines) by hand with absolute certainty, irrespective of the outside temperature and how cold the engine itself might be. This is of special importance to engines used to propel vehicles when they are working with such high-pressure engines.

As a source of heat an open flame may be used before the suction pipe, which can be made by lighting some of the same oil used to work the engine in a little basin. Only a small quantity is required. This medium is the most suitable as it is always present. Naturally any other source of heat may be used.

The invention is schematically illustrated in the drawing in which the single figure is a diagrammatic illustration of an engine operating on heavy fuel oils with self ignition to which this invention is applied. $a$ is the suction pipe, $b$ the inlet, and $c$ the outlet valve. Under the suction piping is the source of heat $d$, a detachable basin, in which some of the fuel is burned to heat sucked in air. At the cam-shafts $e$ of the outlet valve $c$ is a stop $f$ and opposite a correspondingly adjustable cam or control means $g$, whose arm $h$ is connected to the suction valve $k$ of the fuel pump by the rod $i$ and the bell-crank lever $j$.

For starting the engine in its cold state the cam or control means $g$ is turned in the direction of the arrow; the camshaft-gearing e is thereby lifted and the outlet valve c and the suction valve k opened. At the same time the source of heat d is put into action. Then the engine is turned by hand in the usual manner by the crank l and, as soon as the necessary speed is attained, the cam is turned back to its original position which switches on the normal compression and also the fuel feed. The suction air, preheated to a high degree by the heating device d attains a sufficiently high temperature when compressed to cause the spontaneous ignition of the heavy fuel injected into the cylinder. The starting of the engine is thus rendered particularly easy and certain.

While the method herein described, and the form of apparatus for carrying this method into effect, constitute preferred embodiments of the invention, it is to be understood that the invention is not limited to this precise method and form of apparatus, and that changes may be made in either without departing from the scope of the invention which is defined in the appended claims.

What I claim is:

1. The process of starting a high-pressure internal combustion engine of the constant-pressure-cycle type operating on heavy fuel with self ignition which comprises the steps of cranking the engine with cylinder compression relieved and at the same time heating the suction air, and then switching on the usual compression when a suitable speed is attained.

2. The process of starting a high-pressure internal combustion engine of the constant-pressure-cycle type operating on heavy fuel with self ignition which comprises the steps of cranking the engine with compression relieved and with the fuel feed cut off and at the same time heating the suction air, and then switching on the usual compression and the fuel feed when a suitable speed is attained.

3. In an internal combustion engine of the constant-pressure-cycle type having a cylinder provided with a fuel feed, suction-inlet and exhaust valves therefor, the combination with means for holding one of said valves in open position to relieve cylinder compression during engine starting, and means for heating the suction air by an external source of heat, during said starting, said external heating means being independent of engine operation for its heating effect.

4. In a high pressure internal combustion engine of the constant-pressure-cycle type having a cylinder provided with a fuel feed, a suction air inlet, and a valve controlled exhaust outlet, the combination of means for holding said exhaust valve in open position to relieve cylinder compression during engine starting, and means for heating the suction air by an external source of heat during said starting, said external heating means being independent of engine operation for its heating effect.

5. In an internal combustion engine of the constant-pressure-cycle type having a cylinder provided with a fuel feed, a valve controlled suction air inlet, and a valve controlled exhaust outlet, the combination of means for holding one of said valves in open position to relieve cylinder compression, means for cutting off the fuel feed to said cylinder, an interlock between said means to correlate the operation thereof, and means for heating the suction air by an external source of heat during engine starting, said external heating means being independent of engine operation for its heating effect.

6. In an internal combustion engine of the character described having a cylinder operating with fuel injection and self-ignition and provided with a valve controlled suction air inlet, a valve controlled exhaust outlet, a fuel injection feed, and a fuel pump, the combination of means for holding one of said valves in open position to relieve cylinder compression, and means for rendering the fuel pump inoperative whereby to cut off the fuel feed to said cylinder, and means having an external source of heat for heating the suction air supplied to said engine during engine starting, said external heating means being independent of engine operation for its heating effect.

7. In an internal combustion engine of the constant-pressure-cycle type operating with solid fuel injection and self-ignition, and in combination, a cylinder having a valve controlled suction air inlet and a valve controlled exhaust outlet, operating means for said valves driven from said engine, a fuel injection nozzle positioned to inject fuel into said cylinder, a fuel pump driven from said engine for feeding fuel to said injection nozzle and cylinder, said fuel pump having a valve controlling said feed of fuel, an injection piping for connecting said pump with said cylinder to supply fuel thereto, a control means, means associated with said cylinder valve operating means and said control means for holding one of said cylinder valves in open position to relieve cylinder compression upon actuation of said control means, and interconnections between said control means and said pump valve for holding said valve in a position to simultaneously render said pump inoperative upon the actuation of said control means to thereby prevent fuel from being forced under high pressure into said injection piping.

8. In an internal combustion engine of the Diesel type, a cylinder, a valve for said cylinder, means for holding said valve in open position to relieve cylinder compression during engine starting, a combustion air inlet for said cylinder, and means having an external source of heat for heating the combustion air supplied to said engine during engine starting, said external heating means being independent of engine operation for its heating effect.

In testimony whereof I have affixed my signature.

Dr. WILHELM RIEHM.